H. SWAIN.
MOTOR TRUCK.
APPLICATION FILED JUNE 4, 1914.
1,207,658.
Patented Dec. 5, 1916.
2 SHEETS—SHEET 1.
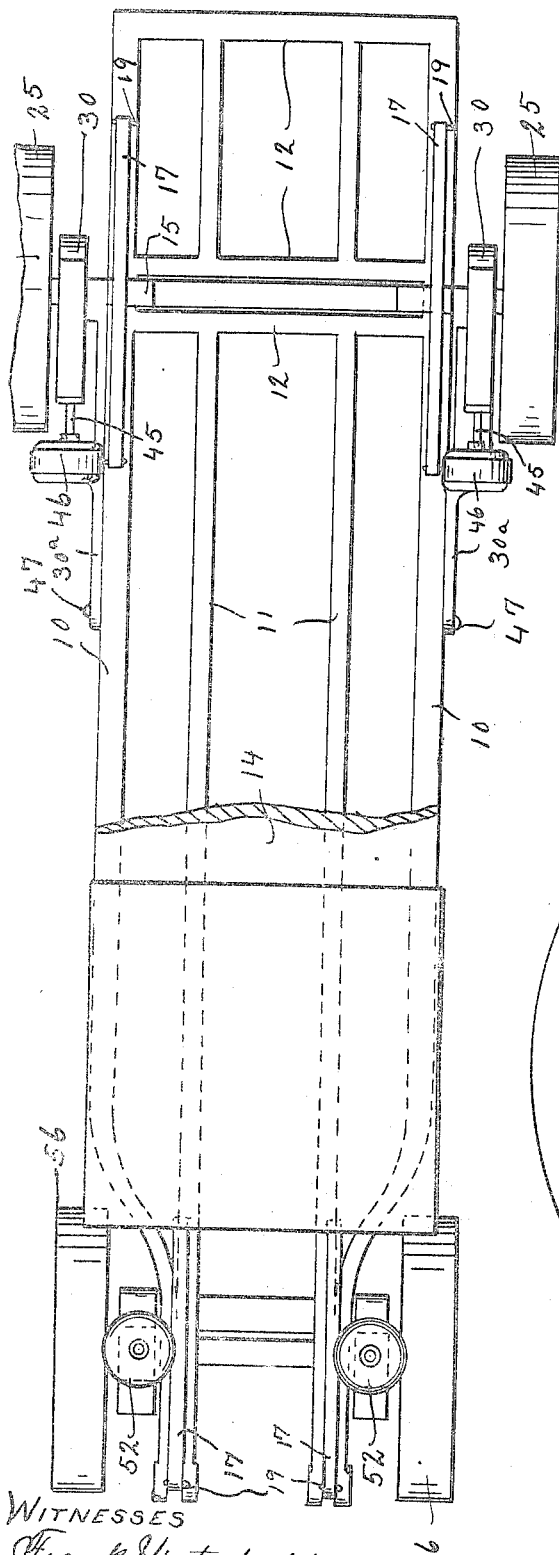
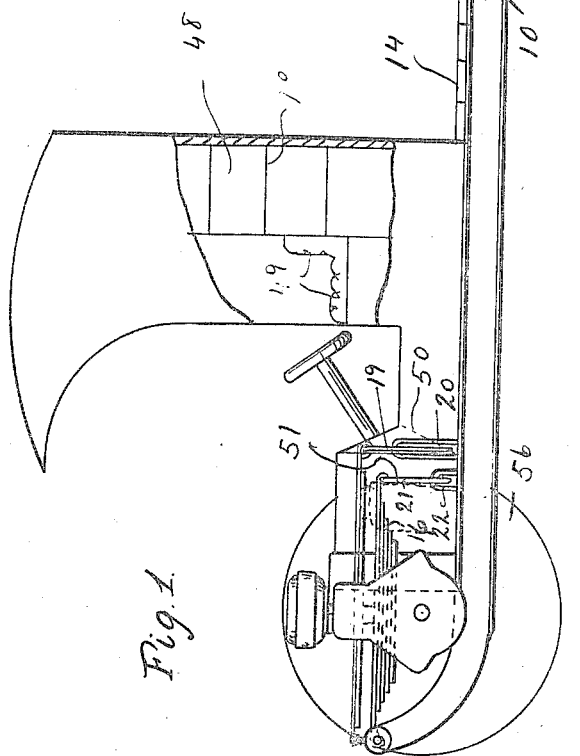
INVENTOR
HADWEN SWAIN.

H. SWAIN.
MOTOR TRUCK.
APPLICATION FILED JUNE 4, 1914.
1,207,658.
Patented Dec. 5, 1916.
2 SHEETS—SHEET 2.
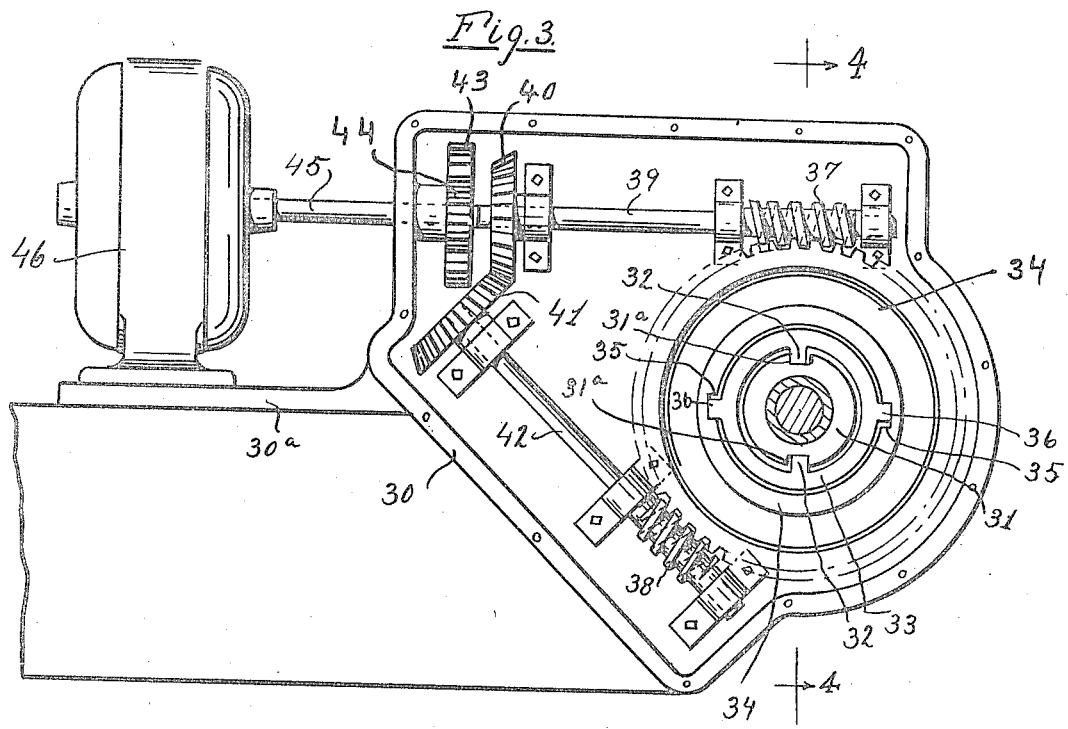
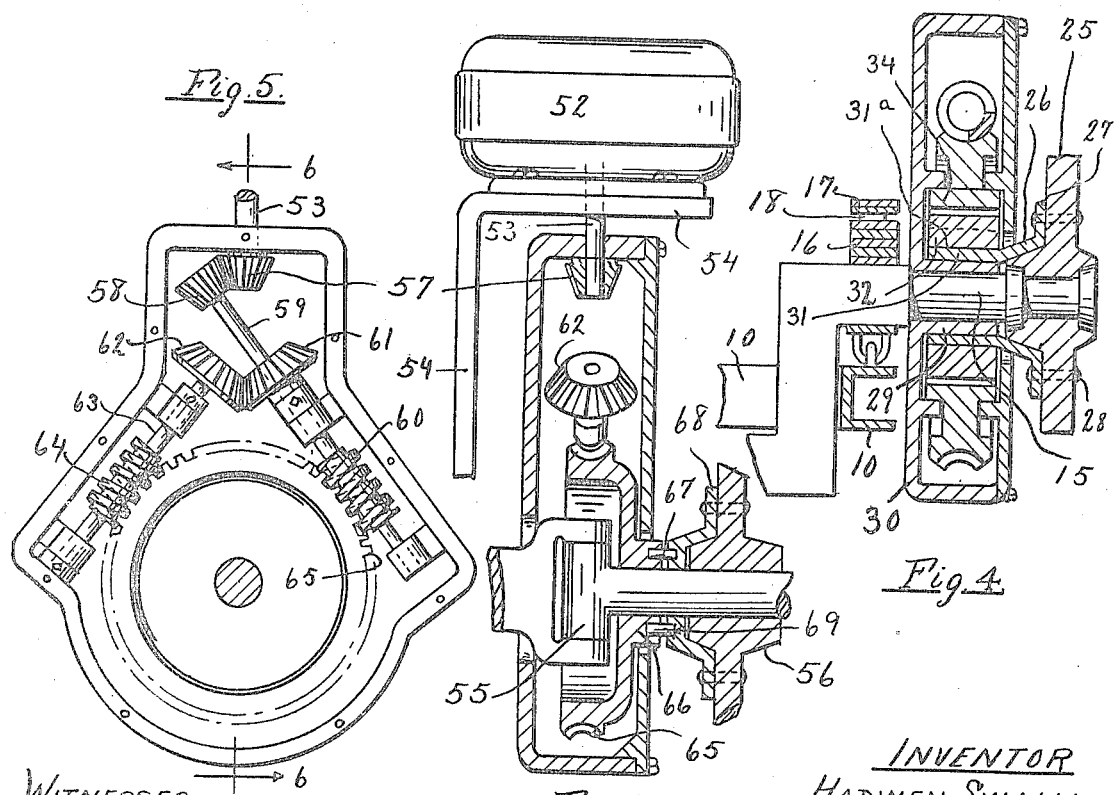
WITNESSES:
INVENTOR
HADWEN SWAIN.
by his Attorney.

UNITED STATES PATENT OFFICE.

HADWEN SWAIN, OF SAN FRANCISCO, CALIFORNIA.

MOTOR-TRUCK.

1,207,658.   Specification of Letters Patent.   Patented Dec. 5, 1916.

Application filed June 4, 1914. Serial No. 843,045.

*To all whom it may concern:*

Be it known that I, HADWEN SWAIN, a citizen of the United States, residing in the city and county of San Francisco and State of California, have invented new and useful Improvements in Motor-Trucks, of which the following is a specification.

My invention relates to an electrically driven truck on which the electrical power is generated by means of a generator operated by a gas engine or other suitable power and the energy stored in a battery and then utilized through a motor to drive one or more wheels as desired, and the object thereof is to provide simple and efficient mechanism for that purpose in which the side pressure or friction on the axles is largely relieved by means of a balanced drive.

In the drawings forming a part of this application, Figure 1 is a side elevation of my improved truck. Fig. 2 is a top plan with a part of the platform removed. Fig. 3 is an enlarged side elevation of the driving mechanism of the rear wheels with a part of the casing or covering removed. Fig. 4 is a section on the line 4—4 of Fig. 3. Fig. 5 is an enlarged side elevation of the driving mechanism of the front wheels with parts of the casing removed. Fig. 6 is a section on the line 6—6 of Fig. 5, with parts in elevation.

In the drawings my truck is shown as a truck with a low hung body and I will describe it as such but the truck may be built with a medium or high hung body. In the latter case the spring suspension of the body and the shape of the axles would be different but the essential features of the invention would not be changed.

The frame of the body of the truck consists of the longitudinal members 10 which run the entire length of the body, and 11 which are broken at the axle. At the front and rear ends and at each side of the rear axle and at other desired points the side members are connected by transverse members 12. The members of the frame are preferably constructed of U-shaped channel iron but any suitable shape may be used. I prefer the U-shaped channel iron as it is lighter for any given strength than any shape that I know of. Upon the top of the frame is secured a floor or platform 14. In a truck with a low hung body the rear axle 15 has its outer ends straight and horizontal. The adjacent portions are bent at right angles to the straight portions and are vertical when positioned for use and pass downwardly just within the side members 10 of the body and to a point below the floor. The central portion passes transversely below the floor. In a high hung body the axle would be straight and pass transversely below the frame. Secured upon the axles, above the side members in a low truck, are suspension springs of which there are preferably two springs for each wheel. These are placed in a more or less parallel position. The springs for each wheel may be one above the other as shown in the drawing or side by side as preferred. One of them, which is shown in the drawing as the upper one at 17 is lighter than the other 16 which may be shorter if desired. If placed one above the other they are spaced by the block 18. The drawing shows the upper or lighter springs having pivotally secured links 19, which are connected to eye bolts 20, mounted on the outside members of the frame. At the ends of the lower or heavier springs are pivotally secured links 21, which may be shorter, if the springs are placed one above the other, than links 19. The links 21 are connected to eyebolts 22 mounted in the outer members of the frame. The eyes of eyebolts 22 are longer than the eyes of eyebolts 20, or the holes in the ends of springs 16 are lengthened vertically, so that the frame, before any load is placed thereon, is hung suspended from the lighter springs. As the body is being loaded, as soon as the weight of the load flexes the lighter springs to a certain extent the heavier springs are brought into play and the body and load are suspended by both the lighter and heavier springs. When the truck is being driven by two wheels the power may be applied to either the front or back wheels. It will be understood that each wheel is being driven separately from the other wheels.

On the rear axles are mounted wheels 25 of suitable construction for truck service. The inner hubs of the rear wheels 25 are flanged at 27 and bolted to 25 by bolts 28. These hubs are extended inward through 26 in a tubular form to 31, the latter surround but do not touch the bearing 29 of the case 30. This bearing 29 is supported by the axle 15.

Placed around outside of the hub 31 is the universal ring 33, this ring has oppositely disposed, two projections 32 which go into two suitable recesses 31ª in the outer surface of hub 31. The universal ring 33 is a loose fit in the wheel hub 31 so the jar of the road will not affect the gears, etc. These universal rings 33 are placed inside of the worm gears 34 and engage the latter through two oppositely disposed projections 36 spaced equidistant from projections 32 on the outer surface of the universals 33, and projecting into suitable recesses 35 in the worm gears 34, the universals not fitting tight, so as to allow some play.

The various devices are alike in both rear wheels. Lugs 32 and 36 are narrower than the recesses into which they are received so as to allow a slight play for starting.

Shaft 39 of worm 37 has mounted thereon a bevel gear 40 which meshes with a bevel gear 41 mounted on shaft 42 of worm 38. Shaft 39 has mounted thereon a gear 43 which meshes with a pinion 44 on shaft 45 of motor 46. If desired other types of gears may be used instead of the worm gears and worms. Case 30 incloses the worms, their shafts and pinions, and worm gear, and pinions on motor shaft as best shown in Figs. 3 and 4. To case 30 is secured an arm 30ª which extends toward the front of the truck and is pivotally secured by bolt 47 to the side 10 of the body. This arm prevents the case from turning on the axle. Motor 46 is mounted on arm 30ª. A like case containing like gears is found on each side of the rear portion of the truck. Motor 46 is electrically connected to a storage battery 48, preferably in a receptacle containing shelves 70, the receptacle being set vertically just back of seat 49. Battery 48 is charged by a dynamo 50 electrically connected thereto of any approved make, which is carried preferably on the body in front of the seat. A gas or other engine 51 of any approved make drives the dynamo. By using a gas or other engine to run the dynamo and by storing its energy in a battery to be used as needed a smaller gas engine can be used than would be required to furnish power to drive the truck as the engine can be run at a constant speed whether the truck is moving or standing still until the battery is fully charged. The front wheels have a motor 52 which is mounted as shown in Fig. 6 so that the shaft 53 passes through a bracket 54 mounted on the front axle. Shaft 53 is in alinement with knuckle pin 55 of the front wheel 56 and carries a pinion 57 which meshes with pinion 58 mounted on shaft 59 of worm 60. Shaft 59 has mounted thereon a bevel gear 61 which meshes with a bevel gear 62 mounted on shaft 63 of worm 64. Worms 63 and 64 engage the cup shaped worm gear 65 which encircles the front knuckle. Gear 65 has a hub 66 which is connected by pins 67, of which there are any suitable number, to a driving plate 68 which is bolted to the front wheel. Pins 67 are received in recesses 69 in driving plate 68. These recesses are a little longer than the diameter of the pins to allow of a little reactive motion when the wheel runs into a rut or over an obstruction. The steering mechanism is of the usual automobile type and is not further shown or described as a part of my invention. It will be understood that suitable control switches are used whereby one or more motors can have its supply of current regulated or cut off entirely independently of the other motors.

In the drawings I have shown each wheel driven by two worms as they balance the drive, and I prefer that construction, but a single worm may be used, or other gears than worms may be used.

If desired the front wheels may be driven by bevel gears instead of the worms shown. One gear is concentric with the knuckle pin 55.

Having described my invention what I claim is:—

1. In an electrically driven vehicle in combination a motor; a shaft driven thereby; a worm on said shaft; a worm gear engaged by the worm; a driven wheel; a connection between said driven wheel and said worm gear; a second shaft operatively connected to and operated by said first shaft; and a worm on said second shaft operatively engaging said worm gear and oppositely disposed as to the first worm.

2. In a vehicle, a running gear comprising wheels and front and rear axles; a body; a spring connection between said body and running gear; cases pivotally mounted on the rear axle and pivotally connected to the body, one on each side, said cases forming radius or distance rods; and independent driving means for each rear wheel mounted on said radius rods.

3. In a vehicle, front and rear axles and wheels mounted thereon; a spring supported body; cases having one end pivotally mounted on the rear axle and the other end pivotally connected to the body, said cases forming radius rods, there being a case on each side of the body; and means to drive the rear wheels thereof mounted on said radius rods, each wheel being driven independently of the other wheel.

4. In a vehicle having a spring supported body and two independently driven rear wheels, a case pivotally mounted on the rear axle at one end and pivotally connected at the other end to the body, said case forming a distance or radius rod and being adapted to receive and support the driving mechanism of a rear wheel.

5. In an electric vehicle a driving and a driven ring; and an intermediate ring operatively but loosely engaged by both the driving and driven rings, said intermediate ring forming a part of the connection between the driven wheel and the driving mechanism whereby portions of the shock on the driven wheel will be prevented from being transmitted to the driving mechanism.

In witness that I claim the foregoing I have hereunto subscribed my name this 17th day of May, 1914.

HADWEN SWAIN.

Witnesses:
F. C. RONUTHWAITE,
E. KEATING.